(12) United States Patent
Wilflinger et al.

(10) Patent No.: US 11,338,738 B2
(45) Date of Patent: May 24, 2022

(54) TREAD DEVICE FOR A RETRACTABLE STEP ACCESS SYSTEM FOR A VEHICLE, AND RETRACTABLE STEP ACCESS SYSTEM WITH A TREAD DEVICE

(71) Applicant: KNORR-BREMSE GESELLSCHAFT MIT BESCHRÄNKTER HAFTUNG, Mödling (AT)

(72) Inventors: Johann Wilflinger, Linz (AT); Stefan Guggenbichler, Linz (AT); Ricarda Leimhofer, Greinsfurth (AT)

(73) Assignee: KNORR-BREMSE GESELLSCHAFT MIT BESCHRÄNKTER HAFTUNG

( * ) Notice: Subject to any disclaimer, the term of this patent is extended or adjusted under 35 U.S.C. 154(b) by 86 days.

(21) Appl. No.: 16/765,031

(22) PCT Filed: Nov. 15, 2018

(86) PCT No.: PCT/EP2018/081422
§ 371 (c)(1),
(2) Date: May 18, 2020

(87) PCT Pub. No.: WO2019/096927
PCT Pub. Date: May 23, 2019

(65) Prior Publication Data
US 2020/0361388 A1 Nov. 19, 2020

(30) Foreign Application Priority Data
Nov. 16, 2017 (DE) ..................... 10 2017 126 948.7

(51) Int. Cl.
*B60R 3/02* (2006.01)

(52) U.S. Cl.
CPC ..................... *B60R 3/02* (2013.01)

(58) Field of Classification Search
CPC ......................................... B60R 3/02
See application file for complete search history.

(56) References Cited

U.S. PATENT DOCUMENTS 6,598,253 B1 * 7/2003 Allen ..................... A61G 3/061
 14/69.5
9,920,535 B2 * 3/2018 Belman ................. E04F 11/002

FOREIGN PATENT DOCUMENTS

DE 102004007497 A1 8/2004
DE 102008061852 A1 6/2010
(Continued)

OTHER PUBLICATIONS

International Search Report and Written Opinion corresponding to PCT/EP2018/081422, dated Feb. 26, 2019.

*Primary Examiner* — Bryan A Evans
(74) *Attorney, Agent, or Firm* — Barnes & Thornburg LLP

(57) ABSTRACT

A tread device for a retractable step access system for a vehicle includes a tread and at least one wiper device. The wiper device is coupled or couplable movably to the tread and configured in the form of a flap and is arranged and designed to wipe off dirt and to form a ramp by lying, under the force of gravity, on the retractable step. The wiper device is arranged and designed to lie on the retractable step both in an operating state, in which the retractable step is arranged protruding from under the tread, and also in a rest state, in which the retractable step is arranged underneath the tread.

18 Claims, 3 Drawing Sheets

(56) References Cited

FOREIGN PATENT DOCUMENTS

| | | | |
|---|---|---|---|
| EP | 0416539 | A1 | 3/1991 |
| EP | 0931532 | A1 | 7/1999 |
| EP | 1034088 | A1 | 9/2000 |
| EP | 1447273 | A2 | 8/2004 |
| EP | 2358576 | A1 | 8/2011 |
| GB | 2306436 | A | 7/1997 |
| WO | 0020252 | A1 | 4/2000 |

* cited by examiner

TREAD DEVICE FOR A RETRACTABLE STEP ACCESS SYSTEM FOR A VEHICLE, AND RETRACTABLE STEP ACCESS SYSTEM WITH A TREAD DEVICE

CROSS REFERENCE AND PRIORITY CLAIM

This patent application is a U.S. National Phase of International Patent Application No. PCT/EP2018/081422 filed Nov. 15, 2018, which claims priority to German Patent Application No. 10 2017 126 948.7, the disclosure of which being incorporated herein by reference in their entireties.

FIELD

The present approach relates to a tread device for a retractable step access system for a vehicle, and to a retractable step access system with a tread device.

BACKGROUND

There are designs of ramps as entry aids for vehicles where a plurality of additional flaps are used. The additional flaps are pushed open counter to their spring prestress when the ramp is extended. EP 1 034 088 B1 describes such a ramp.

SUMMARY

Against this background, the present approach provides an improved tread device for a retractable step access system for a vehicle, and a retractable step access system with an improved tread device.

This is achieved by a tread device for a retractable step access system for a vehicle, and by a retractable step access system with a tread device.

BRIEF DESCRIPTION OF THE FIGURES

Exemplary embodiments of the approach presented here will be explained in more detail in the description below with reference to the figures, in which.

DETAILED DESCRIPTION

Figure 1:
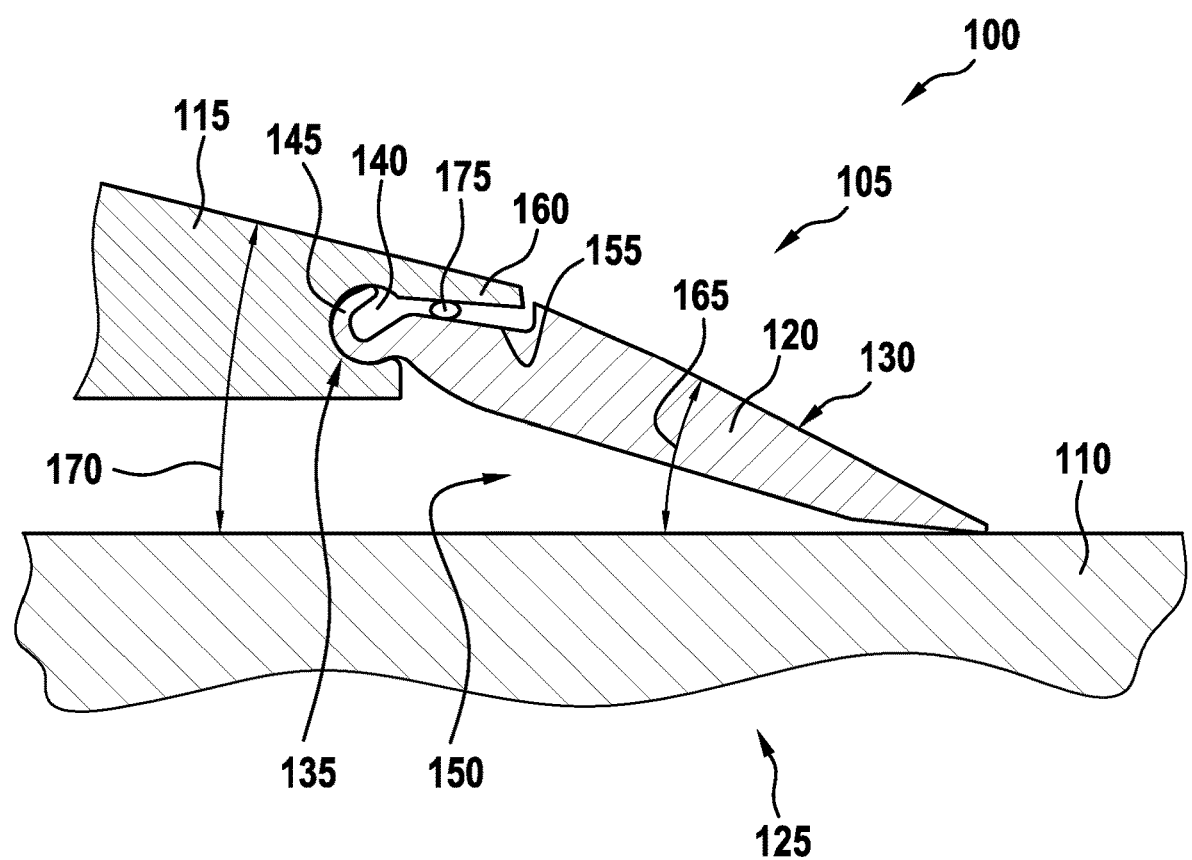
FIG. 1 shows a lateral cross-sectional illustration of a retractable step access system with a tread device according to an exemplary embodiment.

As explained above, the present approach provides an improved tread device for a retractable step access system for a vehicle, and a retractable step access system with an improved tread device.

This is achieved by a tread device for a retractable step access system for a vehicle, and by a retractable step access system with a tread device.

The technical utility which can be achieved with the presented approach is that a mechanically simply designed and low-friction tread device is provided, in which a single component serves both as a ramp for bridging a gap and as a dirt wiper.

A tread device for a retractable step access system for a vehicle has a tread unit and at least one wiper unit. The wiper unit is coupled or can be coupled movably to the tread unit and is configured in the form of a flap. The wiper unit is arranged and designed to rest on the retractable step unit in order to wipe off dirt and form a ramp.

The retractable step unit can be understood as meaning a linearly movable retractable board which, in an inoperative state, is arranged underneath the tread unit and, in an operating state, is arranged so as to protrude from under the tread unit in order to enable a person to tread thereon. The wiper unit can be arranged here between the tread unit and the retractable step unit of the retractable step access system in order to bridge and/or to cover a gap between the tread unit and the retractable step unit. The wording designed can signify here and below that the corresponding element is suitably configured.

The tread device presented here realizes a simple but effective mechanism which ensures that the gap between the tread unit and the retractable step unit is always closed by the wiper unit so that dirt cannot penetrate into the gap.

The tread device makes it possible to realize a small ramp instead of a brush for a retractable step. In an advantageous manner, the design of the ramp means that there is no step. This is a substantial advantage in comparison to a brush which frequently forms a step of more than 10 mm. The flap which is used is advantageously both suitable for wiping off dirt and (at the same time) for configuring the ramp which avoids a step.

The wiper unit is arranged and designed in order, both in the operating state, in which the retractable step unit is arranged so as to protrude from under the tread unit, and in an inoperative state, in which the retractable step unit is arranged underneath the tread unit, to rest on the retractable step unit, for example, under gravitational force or alternatively or additionally using a press-on unit. In the operating state, the retractable step unit can be, for example, completely extended and, in the inoperative state, can be completely retracted. In the inoperative state, the retractable step unit can be stowed under the tread unit. By the wiper unit resting on the retractable step unit irrespective of an extension state of the retractable step unit, the penetration of dirt into the region between retractable step unit and tread unit can be permanently prevented.

The wiper unit can, therefore, be arranged and designed in particular also in order, in the inoperative state, to seal a gap between the retractable step unit and the tread unit. By the wiper unit configured as a flap resting on the step board in the stowed state of the step board, the region between the tread and step board can be sealed in relation to the "outside" by the flap even in the stowed state.

In order to make the wiper unit couplable movably to the tread unit, the tread device can have a hinge joint unit which is designed to couple the wiper unit or make same couplable rotatably to the tread unit.

The wiper unit can be arranged and designed to rest on the retractable step unit under gravitational force in order to form the ramp. According to one embodiment, the resting of the wiper unit under gravitational force is brought about exclusively by a dead weight of the wiper unit. In the resting position, the wiper unit can, therefore, rest on the retractable step unit merely by means of the dead weight. Thus, when the retractable step unit is retracted from the operating state into the inoperative state, advantageously only small frictional forces act on the retractable step unit. It is of advantage here if the tread device, in particular the hinge joint unit of the tread device, is configured, according to one embodiment, without a spring, i.e. without the presence of a spring. Increased stresses or frictional forces on the retractable step unit during the transfer or retraction are, therefore, avoided and, therefore, wear of the latter is minimized. Configured without a spring can mean here that the free end of the wiper unit rests on the retractable step unit without action of a spring force.

In addition or alternatively, the tread device can have a press-on unit which is arranged and designed to press the wiper unit against the retractable step unit in order to form the ramp. A press-on unit can comprise, for example, a spring or an elastic element. The wiper unit can, therefore, be pressed onto the step board, for example, by one or more springs. This is advantageous if the gravitational force of the wiper unit is not considered sufficient for an application.

For example, the tread unit can have a, for example, substantially circular recess into which a hinge portion of the wiper unit is received or can be received. If the hinge portion of the wiper unit furthermore has a corresponding hook, for example also in circular form, which is received or can be received in the recess, this can permit a functional hinge joint.

In order furthermore to permit a practical snap connection between the tread unit and the wiper unit, it is of advantage if the hook comprises a flexible material. The wiper unit is, therefore, mountable and exchangeable rapidly and simply on the tread unit.

In order, in the resting position of the wiper unit, to permit a level or barrier-free bridging of the gap, an end of the wiper unit that faces away from the hinge joint unit can be configured in a tapering manner.

In order to stabilize the tread device in the resting position, the wiper unit can have a groove which is configured in order to receive a lug of the tread unit. The groove can be arranged here, for example, adjacent to the hook. According to one embodiment, the position of the wiper is identical in the retracted and in the extended position (operating position) of the step board. The position of the wiper is independent of the position of the step board. By means of the movability of the wiper, tolerances and step board unevennesses are compensated for. In addition, the frictional force between step board and wiper is limited.

If the tread device according to an advantageous embodiment has a plurality of wiper units which are arranged coupled or can be coupled adjacent to one another to the tread unit in each case, the wiper units in the resting position can particularly advantageously compensate for possible unevennesses of the retractable step unit or tread unit.

A retractable step access system has the tread device in one of the presented variants and the retractable step unit which is arranged in a linearly movable manner under the tread unit. Such a retractable step access system can serve as a complete replacement for known retractable step access systems, wherein the retractable step access system presented here advantageously realizes the advantages of the tread device. The retractable step access system presented here can be configured, for example, as an access system for a vehicle, for example for a rail vehicle.

In the description below of advantageous exemplary embodiments of the present approach, identical or similar reference signs are used for the elements which are illustrated in the various figures and act in a similar manner, with a repeated description of the elements being omitted.

If an exemplary embodiment comprises an "and/or" linkage between a first feature and a second feature, this can be read in such a manner that the exemplary embodiment according to one embodiment has both the first feature and the second feature and according to a further embodiment has either only the first feature or only the second feature.

FIG. 1 shows a lateral cross-sectional illustration of a retractable step access system 100 with a tread device 105 according to an exemplary embodiment.

The retractable step access system 100 comprises the tread device 105 and a retractable step unit 110 which is arranged in a linearly movable manner underneath the tread device 105. The retractable step access system 100 is configured, according to this exemplary embodiment, as an access system for a vehicle.

The tread device 105 comprises a tread unit 115 and at least one wiper unit 120. The wiper unit 120 is coupled movably to the tread unit 115 and is arranged and configured in order, according to an exemplary embodiment, to take up under gravitational force a resting position 130 resting on the retractable step unit 110.

The retractable step unit 110 is also referred to as a step board, the tread unit 115 is also referred to as a tread and the wiper unit 120 is also referred to as a wiper.

According to an exemplary embodiment, the tread device 105 has a hinge joint unit 135 which is designed to couple the wiper unit 120 rotatably to the tread unit 115. The tread device 105 is configured without a spring, according to an exemplary embodiment. According to this exemplary embodiment, the tread unit 115 has a circular recess 140 in which a hinge portion 145 of the wiper unit 120 is received. The hinge portion 145 has by way of example a hook which is received in the recess 140. According to this exemplary embodiment, this hook comprises a flexible material.

The wiper unit 120 is configured, according to this exemplary embodiment, in the form of a flap forming a ramp and bridges a gap 150 between the tread unit 115 and the retractable step unit 110. According to an exemplary embodiment, the wiper unit 120 is configured in the form of a board. A thickness of the wiper unit 120 tapers here toward a support end resting on the retractable step unit 110. The support end has a flattened portion on a side facing the retractable step unit 110 such that the wiper unit 120 at the support end can rest at least approximately flat on a surface of the retractable step unit 110. The ramp avoids a step between the retractable step unit 110 and the tread unit 115. The movable coupling between wiper unit 120 and tread unit 115 makes it possible to compensate, for example, for tolerances with regard to the gap 150 or unevennesses of the retractable step unit 110.

The wiper unit 120 has, adjacent to the hinge portion 145, a groove 155 which is configured to receive a lug 160 of the tread unit 115. According to the exemplary embodiment which is shown, the lug 160 does enter the groove 155 completely. The wiper unit 120 can thereby be still slightly tilted upward. This makes it possible, for example, to overcome unevennesses on the upper side of the retractable step unit 110 during the movement of the retractable step unit 110.

According to an exemplary embodiment, the free end of the wiper unit 120 both in the extended operating state of the retractable step unit 110 and in the inoperative state of the retractable step unit 110, in which the retractable step unit 110 is moved to the greatest possible extent under the tread unit 115, rests on a surface of the retractable step unit 110 that lies on top in the installed state of the retractable step access system 100. The gap 150 between the retractable step unit 110 and the tread unit 115 is thereby sealed by the wiper unit 120 even in the stowed state of the retractable step unit 110.

Exemplary embodiments of the tread device 105 will be described once again below using different words.

The present approach relates to the wiper unit 120 in the form of a wiper for access systems with a retractable step. The wiper unit 120 is used to wipe soiling, i.e. stones, ice, snow, etc., from the retractable step unit 110 in the form of a step board and to prevent same from penetrating into the interior of the retractable step unit 110 or into the gap 150. Furthermore, the wiper unit 120 presented here serves as a ramp by a step between the retractable step unit 110 and tread in the form of the tread unit 115 being bridged. This permits a barrier-free entry and exit of passengers into and from the vehicle which has the retractable step access system 100.

In an advantageous manner, for the wiping off of soiling, such as stones, ice, snow, etc. from the retractable step unit 110 and for preventing the penetration of such soiling into an interior of the retractable step unit 110 and for bridging the step between the retractable step unit 110 and the tread unit 115, just one single element is necessary, namely the wiper unit 120. In addition, the retractable step access system 100 here meets increasing demands in respect of freedom from barriers and advantageously has a mechanically very simple design.

The soiling is wiped off by the wiper unit 120 during a retraction of the retractable step unit 110 from the operating state 125 shown here into an inoperative state, in which the retractable step unit 110 is arranged concealed under the tread unit 115, and is prevented from penetrating into the interior of the retractable step unit 110. The ramp shape of the wiper unit 120 bridges the step between the retractable step unit 110 and the tread unit 115. The requirements with regard to the freedom from barriers can, therefore, be met.

According to an exemplary embodiment, the wiper unit 120 is mounted rotatably in the tread unit 115 via the hinge joint unit 135, which can also be referred to as a rotary joint, and rests on the retractable step unit 110 owing to gravitational force. According to this exemplary embodiment, the wiper unit 120 is composed of rigid plastic, optionally from polyoxymethylene, "POM" for short. The rotatable mounting makes it possible for the wiper unit 120 to compensate for possible tolerances of the retractable step unit 110 and surface deviations of the retractable step unit 110 and to ensure uniform contact with the retractable step unit 110. Soiling, such as stones, ice, snow, etc., is wiped off as the retractable step unit 110 is retracted and cannot enter into the gap 150 between the tread unit 115 and that of the retractable step unit 110 and, as a further result, also cannot enter into the interior space of the step. The rotatable mounting enables the wiper unit 120 to be pressed only by its dead weight onto the retractable step unit 110, as a result of which a frictional force is minimized. An upper side of the wiper unit 120 forms, according to this exemplary embodiment, an angle 165 of between 20° and 40°, for example an angle of 27°, with the horizontal. The wiper unit 120, therefore, forms a ramp between the retractable step unit 110 and the tread unit 115. Adjoining the wiper unit 120, the tread unit 115 according to this exemplary embodiment is guided further at a further angle 170 of between 10° and 20°, for example an angle of 14°.

The tread device 105 finds practical use, as shown here, in access systems with a retractable step unit 110. In addition to the function as a wiper for the retractable step unit 110, the tread device 105 permits a barrier-free entry and exit of the passengers. The transition between retractable step unit 110 and tread unit 115 is stepless because of the ramp-shaped configuration of the wiper unit 120.

In an advantageous manner, two functions are combined in one component, namely the wiper unit 120. Firstly, a function as a wiper and, secondly, a function as a ramp. In order to satisfy barrier-free entry, a complex kinematic step is unnecessary; on the contrary, use of a "standard" retractable step like the retractable step unit 110 shown here is possible. According to an exemplary embodiment, the wiper unit 120 is easily exchangeable in the event of wear or damage owing to a snap connection with the tread unit 115. Overall, in comparison to a kinematic step, only a few moving parts are necessary, as a result of which, an advantage in terms of costs arises and overall less construction space is necessary.

According to an exemplary embodiment, the tread device 105 has a press-on unit 175, for example at least one spring, in order to press the wiper unit 120 against the retractable step unit 110 in order to form the ramp. For example, the press-on unit 175 is arranged between the tread unit 115 and the wiper unit 120.

Figure 2:
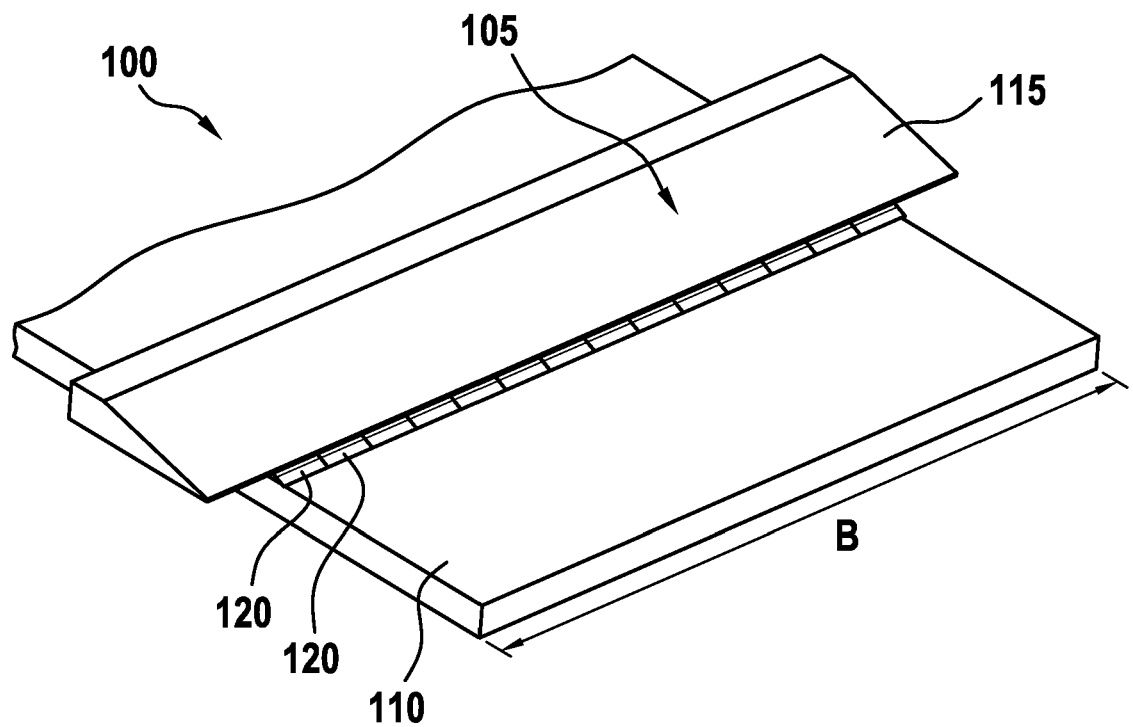
FIG. 2 shows a perspective top view of a retractable step access system with a tread device according to an exemplary embodiment.

FIG. 2 shows a perspective top view of a retractable step access system 100 with a tread device 105 according to an exemplary embodiment. This can be an exemplary embodiment of the retractable step access system 100 which is described with reference to FIG. 1 and which, according to this exemplary embodiment, has a plurality of wiper units 120.

The wiper units 120 are coupled adjacent to one another to the tread unit 115. Since, due to loads exerted by passengers, the retractable step unit 110 and/or the tread unit 115 may sag, the wiper is divided into segments in the form of individual wiper units 120. This ensures that the wiper units 120 rest uniformly over an entire width B of the retractable step unit 110. Furthermore, jamming of the rotatable mounting of the wiper units 120 against the tread unit 115 is thereby prevented. The rotatable mounting is formed in each case as a snap connection by the flexible material of the hooks of the wiper units 120, which facilitates installation and exchangeability of the wiper units 120.

Figure 3:
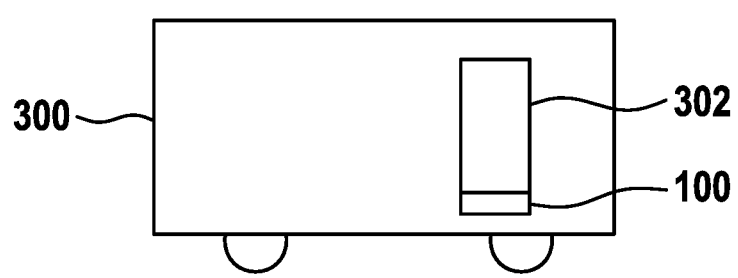
FIG. 3 shows a schematic illustration of a vehicle with a retractable step access system according to an exemplary embodiment.

FIG. 3 shows a schematic illustration of a vehicle 300 with a retractable step access system 100 according to an exemplary embodiment. The vehicle 300 is by way of example a vehicle for conveying passengers, for example a carriage of a train or a bus. The vehicle 300 has a door 302. In order to facilitate entry and exit through the door 302, the retractable step access system 100 is arranged underneath the door 302. The retractable step access system 100 can be designed as described with reference to FIGS. 1 and 2.

When the door 302 is opened, the retractable step unit of the retractable step access system 100 is moved forward in order to take up the operating state under the tread unit of the retractable step access system. The free end of the wiper unit of the retractable step access system 100 continuously rests here on the retractable step unit.

When the door 302 is closed, the retractable step unit is moved back again under the tread unit from the operating state. Since the wiper unit continuously rests on the retractable step unit even during the movement back and, in the process, is supported by the retractable step unit, dirt located on the retractable step unit can be wiped off by the wiper unit as the retractable step unit is being moved back.

Figure 4:
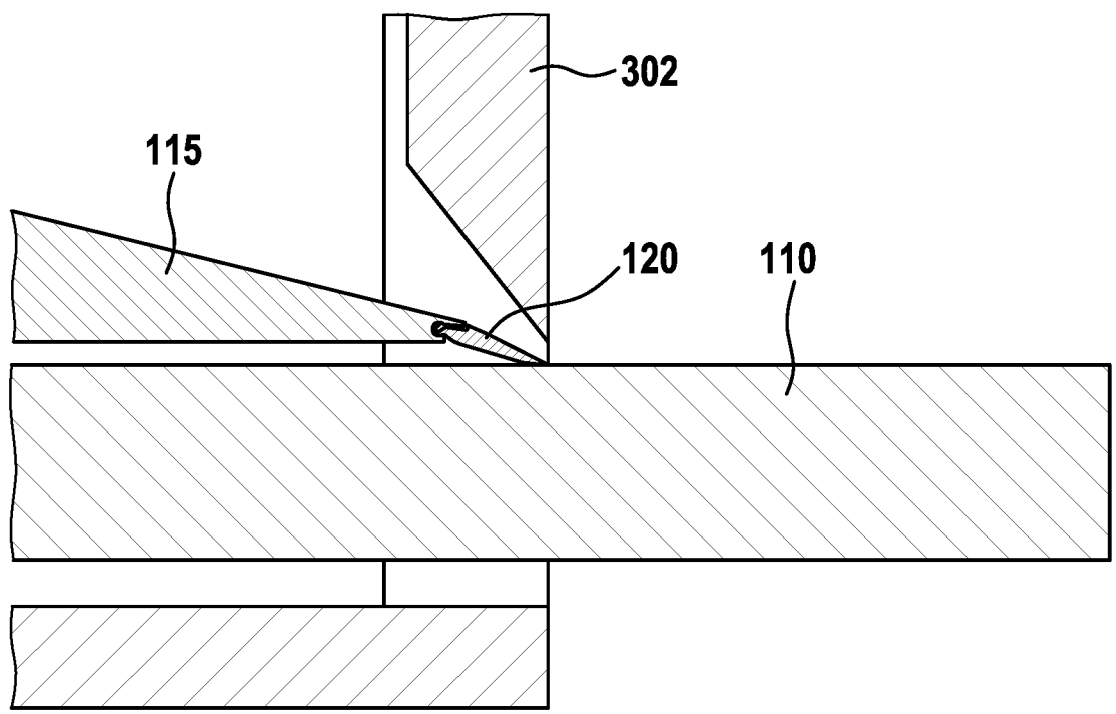
FIG. 4 shows a schematic illustration of a retractable step access system according to an exemplary embodiment.

FIG. 4 shows a schematic illustration of a retractable step access system with a tread device according to an exemplary embodiment. This can be an exemplary embodiment of the retractable step access system described with reference to FIG. 1.

A door 302, a retractable step unit 110 in the form of a step board, a tread unit 115 and a wiper unit 120 which is coupled to the one tread unit 115 and is in the form of a wiper are shown. The retractable step unit 110 is shown in an extended state.

According to an exemplary embodiment, an inclination of the wiper unit 120 corresponds approximately to an inclination of an upper side of the tread unit 115. This results in an approximately rectilinear and in particular in a step-free transition from an upper side of the retractable step unit 110 to the upper side of the tread unit 115.

Figure 5:
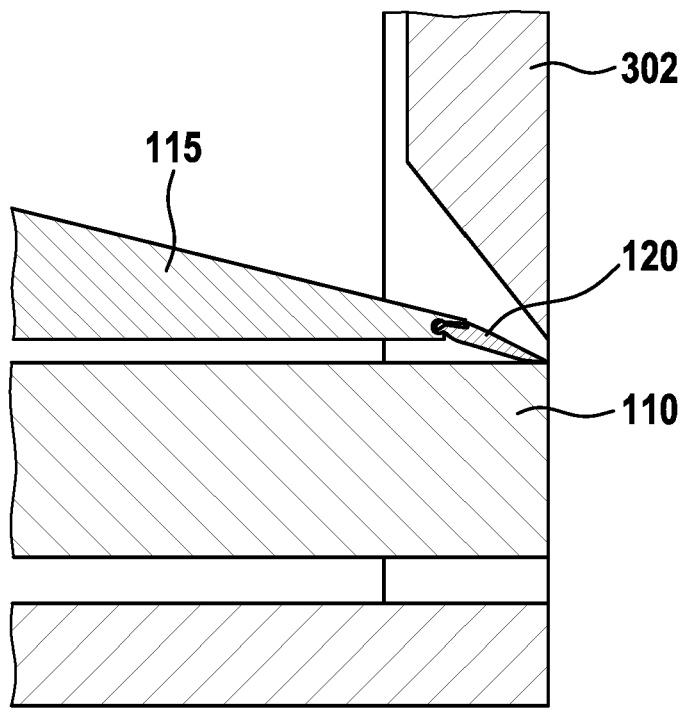
FIG. 5 shows a schematic illustration of a retractable step access system according to an exemplary embodiment.

FIG. 5 shows a schematic illustration of the retractable step access system shown in FIG. 4, wherein the retractable step unit 110 is now illustrated in a retracted state.

According to this exemplary embodiment, the wiper unit 120 in the retracted state of the retractable step unit 110 has the same inclination as in the extended state of the retractable step unit 110.

Therefore, wiper is located the wiper unit 120 is located always in the resting position, irrespective of the extension state of the retractable step unit 110, as described with reference to FIG. 1. The movability between the wiper unit 120 and the tread unit 115 serves, for example, to compensate for tolerances or step board unevennesses and for limiting the frictional force during movement of the retractable step unit 110.

It is apparent from FIG. 5 that the wiper unit 120 is supported on the upper side of the retractable step unit 110 even in the retracted state of the retractable step unit 110. According to this exemplary embodiment, the free end of the wiper unit 120 ends flush with an end edge of the retracted retractable step unit 110.

LIST OF REFERENCE SIGNS

100 Retractable step access system
105 Tread device
110 Retractable step unit
115 Tread unit
120 Wiper unit
125 Operating state
130 Resting position
135 Hinge joint unit
140 Recess
145 Hinge portion
150 Gap
155 Groove
160 Lug
165 Angle
170 Further angle
175 Press-on unit
300 Vehicle
302 Door

The invention claimed is:

1. A tread device for a retractable step access system that includes a linearly movable retractable step unit, for a vehicle, wherein the tread device comprises:
 a tread unit; and
 a plurality of wiper units arranged adjacent to one another coupled or couplable movably to the tread unit, is configured as a flap and is arranged and configured to rest on the retractable step unit to wipe off dirt and form a ramp,
 wherein the wiper unit is arranged and configured to rest on the retractable step unit both in an operating state, in which the retractable step unit is arranged so as to protrude from under the tread unit, and in an inoperative state, in which the retractable step unit is arranged underneath the tread unit.

2. The tread device of claim 1, wherein the plurality of wiper units are arranged and configured, in the inoperative state, to seal a gap between the retractable step unit and the tread unit.

3. The tread device of claim 1, further comprising a hinge joint unit which is configured to couple the wiper unit rotatably to the tread unit.

4. The tread device of claim 1, wherein the plurality of wiper units are arranged and configured to rest on the retractable step unit under gravitational force to form the ramp.

5. The tread device of claim 1, further comprising a press-on unit which is arranged and configured to press the wiper unit against the retractable step unit to form the ramp.

6. The tread device of claim 1, wherein the tread unit has a recess for receiving a hinge portion of the plurality of wiper units.

7. The tread device of claim 6, wherein the hinge portion of the plurality of wiper units has a hook which is received or can be received in the recess.

8. The tread device of claim 7, in which the hook comprises a flexible material.

9. The tread device of claim 1, wherein the wiper unit has a groove which is configured to receive a lug of the tread unit.

10. A retractable step access system comprising the tread device as claimed in claim 1 and the retractable step unit which is arranged in a linearly movable manner under the tread unit.

11. The tread device of claim 10, wherein the wiper unit is arranged and configured, in the inoperative state, to seal a gap between the retractable step unit and the tread unit.

12. The tread device of claim 10, further comprising a hinge joint unit which is configured to couple each of plurality of the wiper units rotatably to the tread unit.

13. The tread device of claim 10, wherein the wiper unit is arranged and configured to rest on the retractable step unit under gravitational force to form the ramp.

14. The tread device of claim 10, further comprising a press-on unit which is arranged and configured to press the plurality of wiper units against the retractable step unit to form the ramp.

15. The tread device of claim 10, wherein the tread unit has a recess for receiving a hinge portion of the plurality of wiper units.

16. The tread device of claim 15, wherein the hinge portion of each of the plurality of wiper units has a hook which is received or can be received in the recess.

17. The tread device of claim 16, wherein the hook comprises a flexible material.

18. The tread device of claim 10, wherein the wiper unit has a groove which is configured to receive a lug of the tread unit.

* * * * *